United States Patent [19]

Genis et al.

[11] Patent Number: 5,061,145
[45] Date of Patent: Oct. 29, 1991

[54] APPARATUS FOR PICKING UP AND TRANSFERRING LIGHTWEIGHT ARTICLES

[75] Inventors: James Genis; Normand J. Madgar, both of Clinton, Ohio

[73] Assignee: Gen-Gar-Inc., Akron, Ohio

[21] Appl. No.: 512,449

[22] Filed: Apr. 19, 1990

[51] Int. Cl.[5] .............................................. B65B 69/00
[52] U.S. Cl. ..................................... 414/325; 406/52; 406/109; 198/443; 221/211; 414/304; 414/736; 414/737
[58] Field of Search ............... 414/304, 325, 736, 237, 414/416; 198/443, 803.5; 221/211, 278; 406/52, 109, 153

[56] References Cited

U.S. PATENT DOCUMENTS

| | | | |
|---|---|---|---|
| 3,058,588 | 10/1962 | Palmquist | 414/737 X |
| 3,240,175 | 3/1966 | Clow | 221/211 X |
| 3,589,531 | 6/1971 | Povlacs | 198/443 X |
| 3,628,648 | 12/1971 | McClusky | 198/443 X |
| 3,760,166 | 9/1973 | Adams et al. | 221/278 X |
| 3,775,034 | 11/1973 | Knapp | 221/211 X |
| 3,820,666 | 6/1974 | Nye et al. | 414/737 |
| 3,868,148 | 2/1975 | Schultz | 406/153 X |
| 3,992,766 | 11/1976 | Field | 414/737 X |
| 4,399,757 | 8/1983 | Maury | 221/211 X |

FOREIGN PATENT DOCUMENTS 2508963 9/1976 Fed. Rep. of Germany ...... 221/211

Primary Examiner—Robert J. Spar
Assistant Examiner—Robert S. Katz
Attorney, Agent, or Firm—Oldham & Oldham Co.

[57] ABSTRACT

An improved apparatus for picking up, transferring and depositing lightweight articles. The apparatus includes a driven rotary member having a pluality of tubular arms extending from circumferentially spaced portions of the member. The ends of these arms pass through a portion of a receptacle in which the articles are stored and suction is set up on these arms at their ends as moved through the receptacle to attract articles thereto. An extracting mechansim is positioned in close proximity to the arc created by the ends of the tubular arms and applies a vacuum, greater than the vacuum applied by said tubular arms, to extract the articles from the tubular arms and transfer the articles to a point of deposit.

14 Claims, 7 Drawing Sheets

APPARATUS FOR PICKING UP AND TRANSFERRING LIGHTWEIGHT ARTICLES

TECHNICAL FIELD

The present invention relates, generally, to an improved device for transferring and counting light articles. More specifically, this invention relates to an improved device for extracting the light articles from the pick-up apparatus, counting such articles and depositing a predetermined number of articles into a positioned container.

DISCUSSION OF THE PRIOR ART

Devices for picking up, transferring and depositing light articles are well-known. However, many earlier devices were relatively bulky, cumbersome and/or expensive. A later apparatus for picking up and transferring light articles was U.S. Pat. No. 3,820,666 to Nye and Medkeff. This apparatus solved many of the problems found previously in related devices.

The Nye/Medkeff patent discloses an apparatus which includes a driven rotary member having a plurality of tubular arms extending from circumferentially spaced portions of the member. The ends of these arms pass through a portion of a receptacle in which the articles are stored and suction is set up on these arms at their ends and moved through the receptacle to attract articles thereto. An air discharge blast is provided in the arms when the articles are to be released.

A counting action is provided by a photoelectric cell and a beam of light supplied thereto. The beam is interrupted when an arm with a flexible lightweight article attached thereto passes between these two members. Such activations of the photoelectric cell are transmitted to a standard counter mechanism. The counter, through means well-known in the art, can be preset so that after a predetermined number of flexible articles pass the photocell. The photocell is energized to close a contact which could be operatively connected to a packing machine. The counter mechanism is also operatively connected to control the supply of suctional forces and discharge air to the different support arms.

However, the apparatus disclosed in the Nye/Medkeff patent has several limitations. First, the counting mechanism must be properly adjusted in order to yield an accurate count. The photocell of this device is positioned above the receptacle such that it counts the lightweight articles as they are attached to a tubular arm. Such counts can be erroneous if the photocell and light beam unit are not properly positioned. An adjustment of the unit which is too high results in a beam which is broken by each tubular arm whether or not a lightweight article is attached thereto. This results in a count which is higher than the actual number of units packaged. If the counter mechanism is set too low, the beam is not broken by each lightweight article attached to a tubular arm. This results in a figure which is lower than the actual number of articles packaged. This photocell cell unit if not properly adjusted when used in conjunction with vinyl gloves, may erroneously count one or more fingers of each glove instead of counting the glove itself. Perhaps, the biggest disadvantage is that each of the components must be recalibrated (air pressure, photocell, etc) each time the rotational speed is altered.

This prior art invention is generally not capable of accurately counting more that 600 lightweight articles per minute.

Therefore, because of these various limitations, an improved device for transferring and counting such devices is subsequently presented.

SUMMARY OF THE INVENTION

The present invention generally stated is an improved device for transferring and counting lightweight articles. More specifically, the present invention relates to a device which picks up a lightweight article with a tubular arm, extracts the lightweight articles from the tubular arms, counts each article and deposits such articles at a determined location.

The present invention employs an improved control disc for selectively supplying a vacuum to the tubular arms for article pick-up. Additionally, the invention uses a venturi principle to create a second vacuum which pulls the articles from a tubular arm and forces such articles past a counter curtain. Continued force of the vacuum, causes the article to move through a tube system to the point of deposit.

It is an object of the present invention to provide an improved device for transferring and counting lightweight articles which counts articles more accurately that previously possible.

It is an object of the present invention to provide an improved device for transferring and counting lightweight articles which requires significantly less adjustment than the prior art.

It is a further object of the present invention to provide an improved device for transferring and counting lightweight articles which counts such articles at a much greater speed than previously possible.

It is still a further object of the present invention to provide an improved device for transferring and counting lightweight articles such that multiple transferring counting units can be used with a single apparatus for picking up these articles.

It is a further object of the present invention to provide an improved device for transferring and counting lightweight articles which can selectively supply a vacuum to the arms for article pick-up.

These and other objects and advantages of the present invention will become more readily apparent from the more detailed description of the preferred embodiments taken in conjunction with the drawings wherein similar elements are identified by the numerals through several views. Such objects and advantages are acheived by an improved device for picking up and transferring light articles of the type including an open top receptacle for said articles, a frame, a support arm extending upwardly from said frame, a support shaft, said support shaft being mounted on said support arm and extending downwardly towards the receptacle, a driven rotary carrier plate attached to said support shaft, a plurality of tubular arms extending from circumferentially spaced portions of said carrier plate and with their ends being positioned for passing through a portion of said receptacle in one part of their rotary movement, said rotary member with tubular arms thereon being positioned above said receptacle, a stationary control disc extending about said support shaft and having an axial face, said axial face abuttingly engaging said rotary plate, a support bar connected to said frame and rivetably attached to said control disc, and a suction supply attached to said manifold so that as said carrier plate rotates, said tubular arms are supplied with a vacuum to carry said lightweight articles, thereby and wherein the improvement comprises a means for extracting said articles from said tubular arms.

BRIEF DESCRIPTION OF THE DRAWINGS

In order to better understand the present invention, reference is made to the accompanying drawings, wherein.

DETAILED DESCRIPTION OF THE PREFERRED EMBODIMENT

Figure 1:
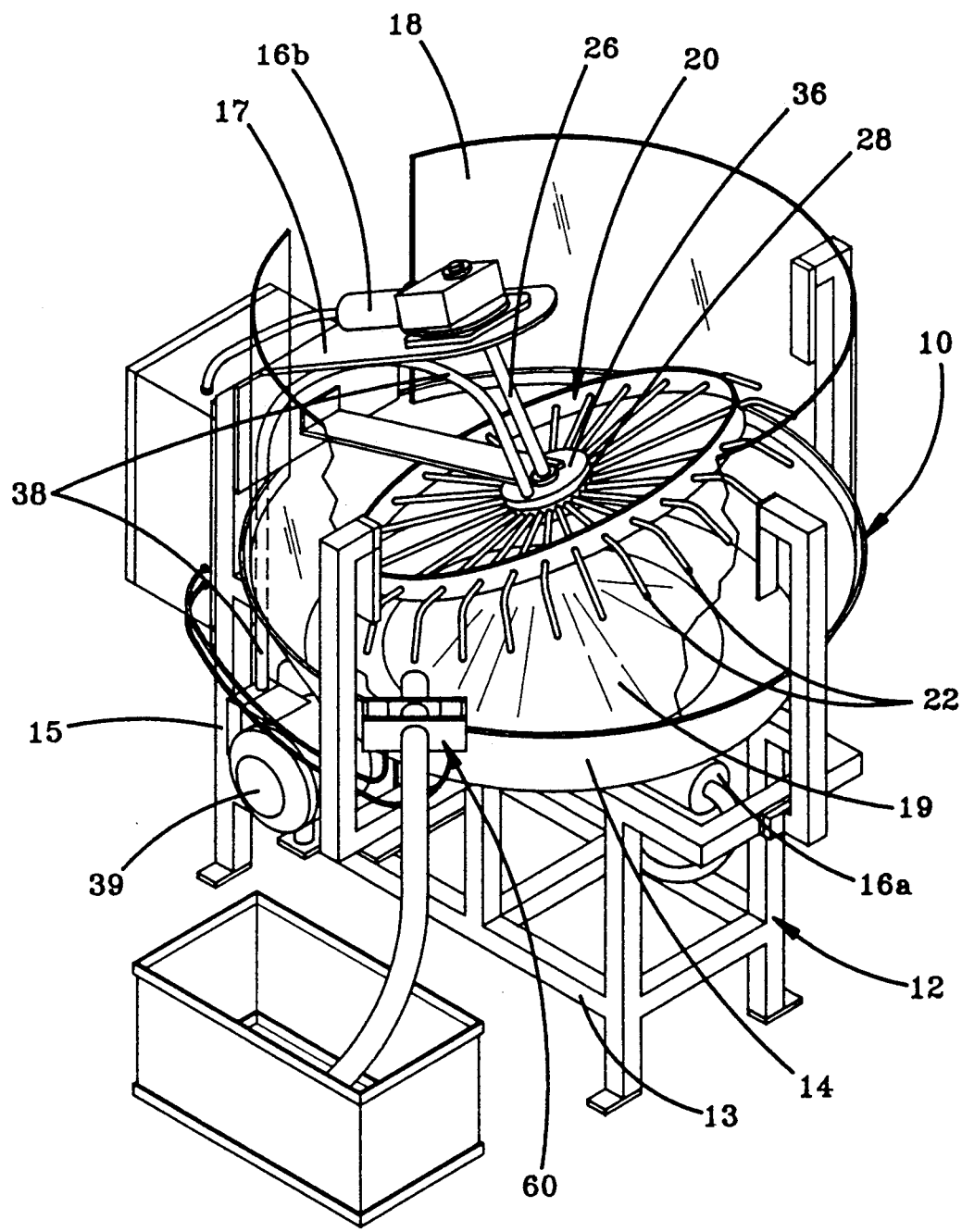
FIG. 1 is a perspective view of an apparatus employing the principles of the present invention.

This invention will be described in detail with reference to the preferred embodiment thereof. Like elements are identified by the reference numerals throughout the drawings and specification.

The present invention is an improvement over the prior art U.S. Pat. No. 3,820,666 to Nye and Medkeff. The basic principles for picking up light articles remain the same.

Now with reference to FIG. 1 of the present invention, such figure shows an improved device for picking up, transferring and counting lightweight articles and is generally referred to by the numeral 10. The device discloses a frame 12, and opened topped receptacle 14 located over the base of said frame 12, and two independent driving members 16a and 16b.

The frame 12 comprises generally a base 13, a vertical brace 15 attached to or a port of one end of the base, and a support arm 17 attached to the upper portion of said vertical brace 15. This support arm 17 angles generally upward and over the base 13 of the frame.

The receptacle 14 is essentially circular in shape and has an open top. This receptacle has a substantially conical shaped center section 19 projecting upward into the open area of the receptacle 14. The receptacle 14 is mounted on a support assembly 40 attached to a vertical drive shaft (not shown). The support assembly 40 maintains the receptacle 14 in a position just above the base 13. The vertical shaft is operatively connected to a first driving member 16a. This driving member 16a is preferably a self-contained electrical rotary motor. This rotary motor when powered causes the shaft to rotate the receptacle 14 during use. The driving member 16a is shown as a self-containing unit although any conventional driving means is contemplated. One alternative would be a belt driven system.

The receptacle 14 is adapted to receive a plurality of lightweight articles 50, such as balloons or flexible gloves. These lightweight articles 50 are introduced into the receptacle 14 manually or by means independent of the present invention.

As was used in the prior art, a shaft 26 is operatively journaled to support arm 17 such that it angled downward and into the open area of said receptacle 14. The shaft 26 is rotatably mounted in support arm 17 and driven by a second driving member 16b similar to the first driving member. As was discussed previously, alternatively a belt driven rotary motor assembly could be utilized. Shaft 26 could be driven by the same belt driven system used to rotate shaft 42 or these systems could be independent of one another.

An essentially circular carrier plate 28 to which a plurality carrier arms 22 extend outwardly therefrom, is operatively affixed to the lower portion of said shaft 26. These carrier arms extend outward from the carrier plate 28 then downward in to the receptacle 14. These arms 22 have a bore through their entire length through which a vacuum is applied. Each arm 22 is used to pick up a single lightweight article.

A manifold or control disc 36 is fixedly positioned to abut on a face of the carrier plate 28 as shown in FIG. 1. The control disc 36 and carrier plate 28, collectively control the vacuum supplied to the carrier arms 22. This control disc 36 is generally made from any suitable material such as plastic or nylon. Control disc 36 is operatively installed on the present invention and operated in a manner similar to the prior art.

Figure 2:
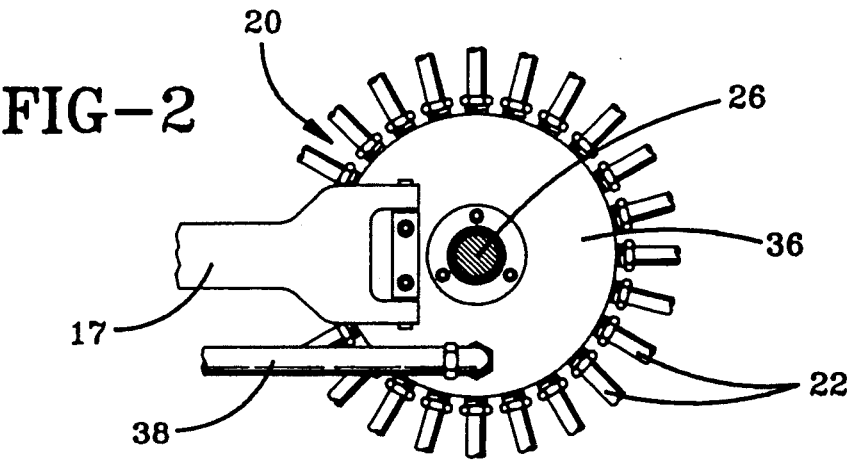
FIG. 2 is a top elevational view of the control disc and tubular arm assembly.

FIG. 2 shows a top view of the control disc 36. The device of the present invention includes a vacuum supply line 38 which connects to an elongated circumferentially extending slot 32 provided in the radially outer section of the control disc 36. Line 38 is connected to a powered vacuum unit 39. This slot 32 is formed on the surface of control disc 36 which is immediately adjacent to carrier plate 28 and is more clearly illustrated in FIG. 3. This slot 32 contacts a plurality of holes 27 on the adjacent carrier plate 28. Vacuum supply line 38 is connected to slot 32 by an aperture cut in control disc 36.

Device 10 shows a guard 18 comprising a vertical wall formed in a circular shape having a diameter approximately equal to the diameter of said receptacle 14. This guard 18 is positioned just above the upper lip of said receptacle 14 and substantially encircles the area above the receptacle 14 and the carrier plate 28 of carrier arm assembly 20. This guard 18 is preferably made of clear thermoplastic sheeted material, such as polyvinyl chloride, polystyrene, polypropylene, methyl methacrylate and copolymers thereof. A suitable material is poly-methyl methacrylate, known in the art and sold commercially as PLEXIGLAS ®. The guard 18 could also be opaque or translucent and made of sheeted metal or glass material as well. The preferred thickness of guard 18 is generally one-eighth to one-quarter inch but various thicknesses could be employed.

Figure 3:
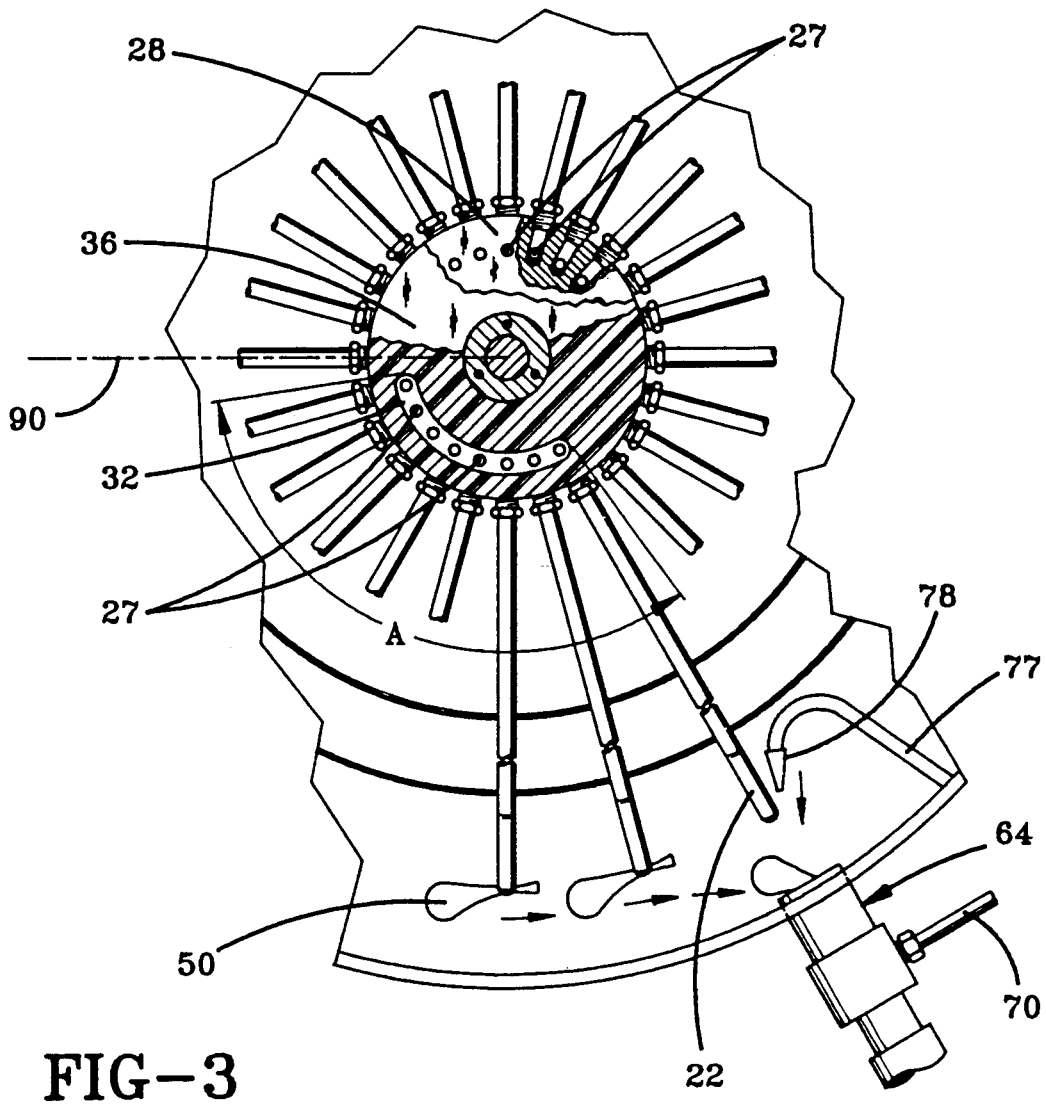
FIG. 3 is an enlarged fragmentary top elevational view of the control disc and tubular arm assembly with a section of the control disc cut away for purposes of illustration.

The drawings clearly show that the carrier assembly 20 is positioned in device 10 such that carrier arms 22 rotate through a plane inclined to the horizontal so that a portion of the plane is extended above the top of the receptacle 14. The carrier arms 22 rotate, generally, in a counterclockwise direction. Reference line 90 in FIG. 3 represents the point on a carrier arm's circular path where each arm reaches its lowest vertical position. This line 90 for purposes of explanation is designated as the starting and ending point of one complete rotation or 0°.

Arc A as shown in FIG. 3 represents the approximate arc of control disc 36 which is occupied by slot 32. The ends of carrier arms 22 are provided with suction as they move through Arc A. The suction applied is adequate to pick-up and retain a single lightweight article 50 on the end of a tubular carrier arm 22 as the arm swings through arc A. As a carrier arm 22 reaches a point in its rotation which is about 45° past reference line 90 each arm 22 begins to ascend out and away from receptacle 14 and rotates in close proximity to guard 18.

Figure 4:
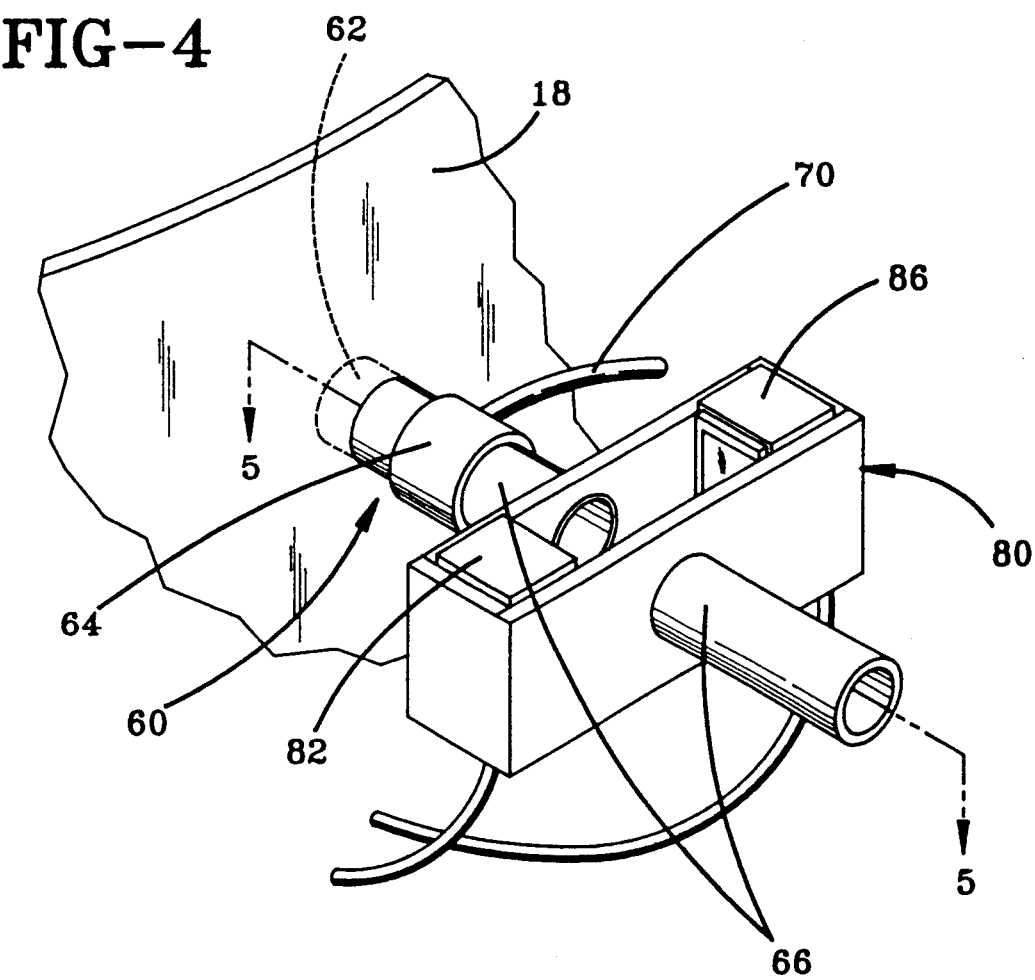
FIG. 4 is a top perspective of the transfer and counting means of the present invention.

A transfer means, generally 60, is installed at a point in the guard which approximates the portion of slot 32 located furthest from reference line 90. Transfer means 60 is installed through an aperture 62 in guard 18. Aperture 62 is cut in guard 18 in such a position that the terminal end of a carrier arm 22 retaining a lightweight article 50 passes in close proximity thereto. The aperture 62 is essentially circular and approximately 1½ inches in diameter, although virtually any shapes or diameter could be used. The transfer means 60, shown in FIG. 4 comprises a vacuum generator tube 64, a means for supplying air into said tube and a wall on the internal surface of said tube for narrowing the opening of a segment of said tube 64.

The preferred embodiment of the vacuum generator tube 64 is shown as being circular in transverse cross-section and approximately 1½ inches in diameter. The tube 64 could be made of any material known in the art, but aluminum or related alloys are preferred. The tube is attached to the outer surface of guard 18 so as to circumscribe hole 62. Such attachment is made by any means known in the art.

Figure 5:
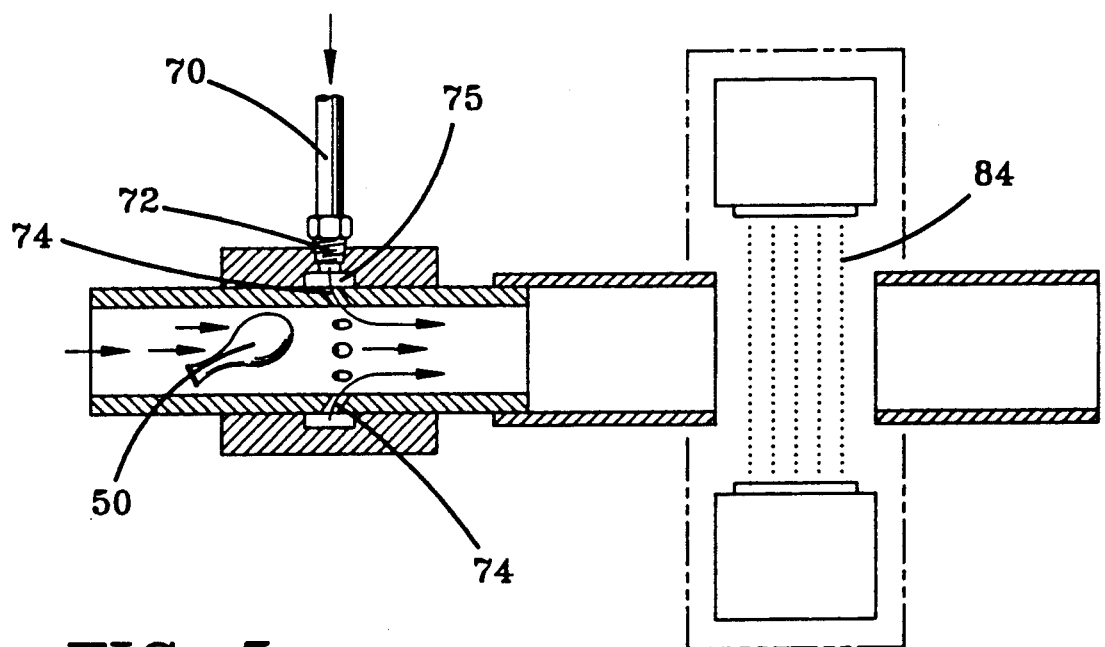
FIG. 5 is a longitudinal cross-sectional view taken along line 5—5 of FIG. 4.
Figure 5A:
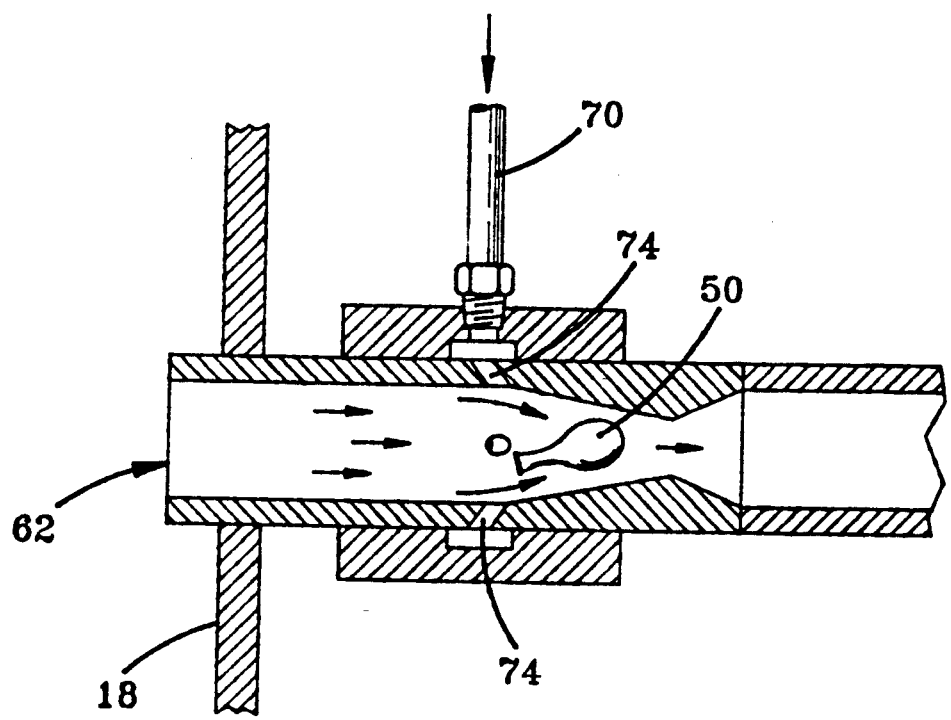
FIG. 5a is a longitudinal cross-sectional view of an alternative embodiment incorporating a venturi tube and taken along a line similar to 5—5 of FIG. 4.
Figure 6:
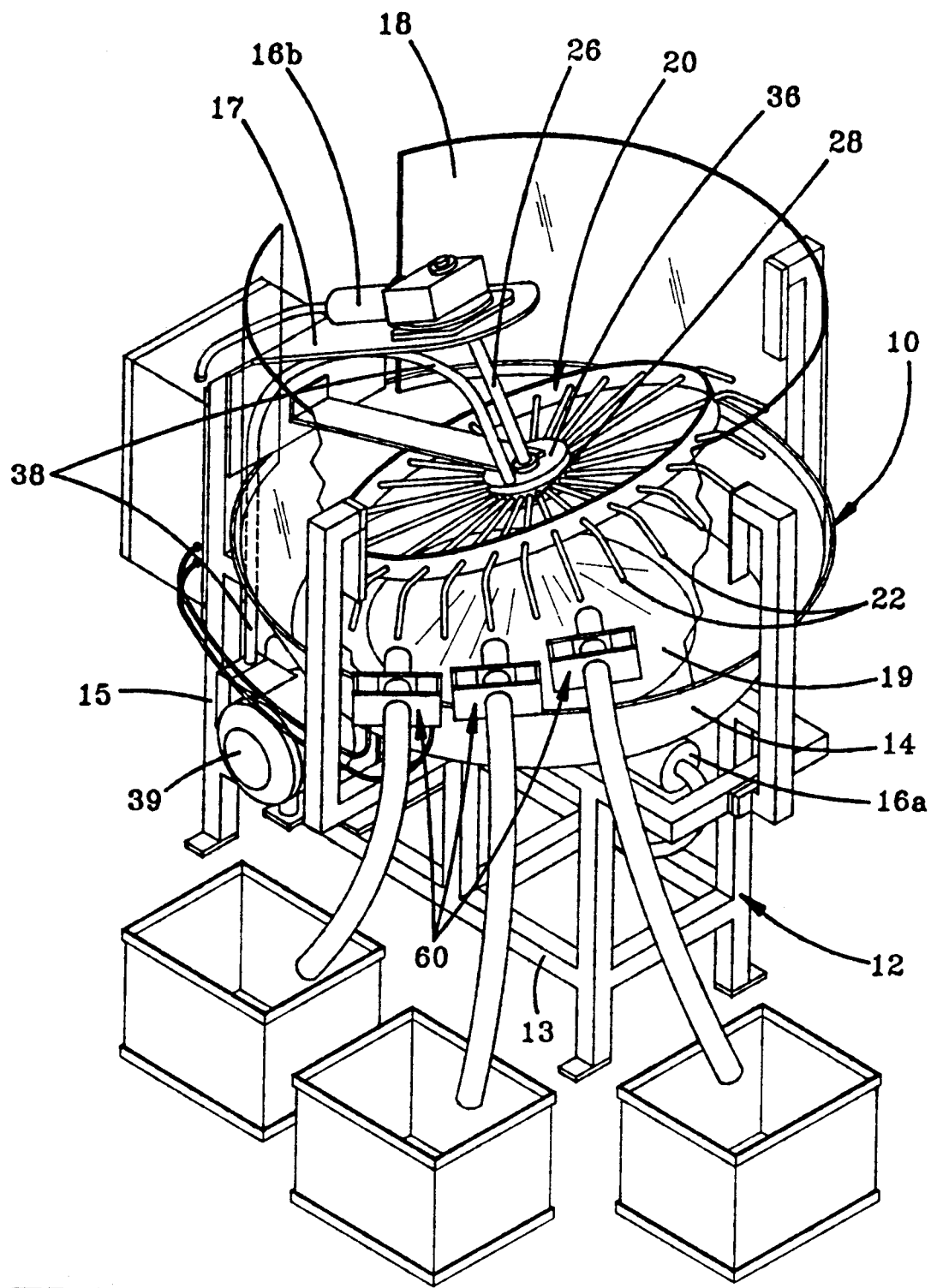
FIG. 6 is a perspective view of an apparatus employing the principles of the present invention and disclosing a plurality of transferring and carrying means.

Vacuum generator tubes 64 are well known in the art. These tubes are commercially available and one manufacturer of such tubes is Vaccon Co., Norwood, Me. The preferred embodiment illustrated in FIG. 5 uses a tube 64 which operates similar to a jet pump. Compressed air is supplied from air supply line 70 into an outside annular channel 75 of tube 64 at a range of about 50–120 psi. The air exits this channel and into the bore of tube 64 through a plurality of apertures 74 generally directed away from aperture 62 at a greatly increased velocity. These streams of air collectively rotate in a somewhat helical manner to produce a powerful vacuum near the opening of aperture 62 which will draw lightweight articles into and through the tube 64. After the lightweight article passes apertures 74 in tube 64, the air exiting apertures 74 propels the lightweight article 50 through the system.

Another embodiment uses a venturi effect to draw lightweight articles in and through a venturi tube. The venturi effect is created by forcing compressed air from air supply line 70 through an aperture and directed into the venturi section of the tube. A venturi tube is generally described as having an inner wall at each end of the tube with defines an opening of its widest diameter. The wall quickly slopes inward to define a progressively narrower opening having a diameter which is approximately one-half of the original diameter. As the air exits the aperture it expands, thereby greatly increasing the velocity as it enters the venturi section. This creates the vacuum at the opening of the tube, adjacent aperture 62.

Still an alternative embodiment contemplates a positive pressure means connected to air supply line 70 or another source of positive air pressure by supply line 77 to force lightweight articles off the carrier arms 22, through aperture 62 and through the transfer means 60. Such a device preferably comprises a nozzle 78 which is positioned inside the circumference defined by the rotation of the carrier arm assembly 20 as the aperture 62. Nozzle 78 is positioned such that it directs a constant or intermittent stream of air towards lightweight articles 50, blowing the lightweight articles 50 off the carrier arm, through aperture 62 and into the transfer means 60. This embodiment is contemplated as preferably originating from an opening in guard 18 or cone 19 in receptacle 14, and mounted by any means known in the art.

In the preferred embodiment, air supply line 70 is attached to vacuum generator tube 64 at input entry port 72. A constant and positive discharge of air is forced through supply line 70 and into annular channel 75 of tube 64. The air discharged from supply line 70 is preferably in a range from about 50–120 psi, and a pressure of 80–100 psi is considered optimum.

After exiting vacuum generator tube 64, lightweight articles 50 are propelled through a length of tubing 66 past a counting means. This tube could be made of any material or shape known in the art, but must be of sufficient diameter to allow unrestricted movement of lightweight articles through the length of the tube 66.

Photoelectric curtains 80 are well-known in the art. Generally this curtain 80 comprises a light source 82 on one side which directs a plurality of light beams 84 across an opening. Each beam is detected by one or more photoelectric sensors 86. These sensors 86 determine the presence of the light beams 84 and can identify each time one or more beams are broken. The preferred embodiment discloses light beams 84 in vertical alignment or perpendicular to the flow of air through the tube.

One or more beams 84 are interrupted each time a lightweight article passes through the curtain 80. The number of interruptions is counted by the photoelectric curtain 80 and these actuations are transmitted to a standard counting mechanism. As lightweight articles 50 exit the counting mechanism 80 such articles pass through a second length of tube system 66 to the point of deposit.

This system is substantially faster and more accurate than the prior art. System can count up to about 1000 lightweight articles per minute depending on the size of the articles to be counted. The photoelectric curtain 80 ensures that each article 50 is counted and counted only once. Because the lightweight articles 50 are now drawn off the carrier arms 22 and propelled through the tube system by a venturi principle initially, and by the positive forced air pressure subsequently, the present invention can operate at a much higher speed. The accuracy is further increased by the distance placed between each lightweight article. This is due to the increased speed by which each article travels through the system and the increased counting capacity due to this speed. After each article 50 is counted, such articles can be transferred to the point of deposit by any type of rigid or flexible tubing known in the art.

Because of the speed by which the articles are counted it takes much less time to package a predetermined number of units. Therefore, the present invention is capable of using more than one combined transferring and counting means on a single pick-up unit. A device using up to three transferring and counting assemblies is preferred although any number could be contemplated.

Each assembly is located in a horizontal alignment and in close proximity to one another. Collectively, the apertures 62 in guard 18 for all units would preferably be located within a range of about 120°–180° from reference line 90. However, modifications in slot 32 on control disc 36 can be made so that apertures for any unit could be located in the guard at a plurality of points adjacent to the arc formed by carrier arms 22.

The counting mechanism 80 after counting a predetermined number of units in a first assembly activates a switch. This switch closes a first circuit and opens a second circuit. This second circuit activates a like venturi vacuum and counting assembly. This assembly after transferring and counting a second predetermined number of units in a first assembly, activates a switch which closes a second circuit and opens a third circuit. This third circuit again transfers and counts a predetermined number of units in the third assembly and activates a switch which closes a third circuit and reopens the first circuit.

Alternatively, a device utilizing a single venturi tube 64 to extract an article from carrier arm 22 and transfer it to the point of deposit and a related counting mechanism can be used. In this instance after the counter counts a predetermined number of articles, the counter activates a switch which closes one exit chute and opens another. This process is repeated each time the counter reaches the predetermined number of units.

While the vacuum generator or venturi tube is the preferred method of extracting articles from said carrier arms, any means of producing a suction to extract the lightweight article from the carrier arms or use positive pressure to remove the same is contemplated.

While in accordance with the patent statutes the best mode and preferred embodiment of the invention has been described, it is to be understood that the invention is not limited thereto, but rather is to be measured by the scope and spirit of the appended claims.

What is claimed is:

1. An improved device for picking up and transferring light articles of the type including an open top receptacle for said articles, a frame, a support arm extending upwardly from said frame, a support shaft, said support shaft being mounted on said support arm and extending downwardly towards the receptacle, a driven rotary carrier plate attached to said support shaft, a plurality of tubular arms extending from circumferentially spaced portions of said carrier plate and with their ends being positioned for passing through a portion of said receptacle in one part of their rotary movement, said rotary member with tubular arms thereon being positioned above said receptacle, a stationary control disc extending about said support shaft and having an axial face, said axial face abuttingly engaging said rotary plate, a support bar connected to said frame and rivetably attached to said control disc, and a suction supply attached to said manifold so that as said carrier plate rotates, said tubular arms are supplied with a vacuum to carry said lightweight articles, thereby and wherein the improvement comprises:
   a means for extracting said articles from said tubular arms by imparting a vacuum on to said lightweight articles, said extracting means positioned in close proximity to an arc created by an outermost end of said tubular arms; and
   a means for transporting said lightweight articles from said extracting means to a point of deposit.

2. A device according to claim 1 wherein said means for creating a vacuum comprises:
   a venturi tube having a bore cut through its length, said bore having a first and second open end and being of sufficient diameter to permit passage of said lightweight articles, said first opened end positioned in close proximity to an arc created by an outer most end of said tubular arms;
   an air inlet port, integrally attached to said venturi tube and having a bore cut through its length, said bore intersecting the bore of said venturi tube; and
   a means for supplying compressed air connected to said air inlet port, said supplying means forcing air into said venturi tube bore to create a vacuum at said first open end of said venturi tube for extracting said lightweight articles from said tubular arms.

3. A device according to claim 2 wherein said compressed air is supplied at a pressure ranging from ranging from about 50 psi to about 200 psi.

4. A device according to claim 3 wherein said compressed air is supplied at a pressure ranging at about 80 psi to about 100 psi.

5. A device according to claim 1 wherein the transporting means comprises a length of hollow tubing.

6. A device according to claim 5 wherein the length of hollow tubing is flexible.

7. The device according to claim 1 wherein the device further comprises a means for counting said lightweight articles located between said means for extracting said articles and said point of deposit.

8. A device according to claim 7 wherein said counting means comprises a plurality of light beams operatively connected with one or more photoelectric cells to detect said light beams and interruptions therein.

9. A device according to claim 1 wherein said means for creating a vacuum comprises:
   a vacuum generator having an inner and outer diameter and comprising a length of tubing having a bore cut through its length, said bore having a first and second open end and having a sufficient inner diameter to permit the passage of said lightweight articles, said tube having one or more apertures cut through a thickness in said tube and intersecting said bore, said apertures generally directed toward said second open end;
   a sleeve having an inner diameter just slightly larger than said outer diameter of said tube, and having an annular channel formed on its inner diameter and an air inlet port cut through a thickness of said sleeve and intersecting said annular channel;
   said sleeve circumscribingly engaging said tube such that said annular channel connects said apertures of said tube;
   a means for supplying compressed air connected to said air inlet port, said supplying means forcing air into said annular channel and into said bore of the vacuum generator through said apertures to create a vacuum at said first open end of said venturi tube for extracting said lightweight articles from said tubular arms.

10. The device according to claim 9 wherein said compressed air is supplied at a pressure from about 50 psi to about 200 psi.

11. The device according to claim 10 wherein the compressed air is supplied at a pressure of about 80 psi to about 100 psi.

12. A device according to claim 1 wherein said means for extracting said lightweight articles further comprises:
   a means for directing positive pressure to said lightweight article, said directing means being independent from said tubular arms and positioned in close proximity of an arc created by said outermost end of said tubular arms;

and a tubular member positioned in close proximity to said arc created by said outermost end of said tubular arms and on the opposite side of said arm from said directing means such that said directing means is capable of discharging a supply of positive pressure sufficient to expel said lightweight articles from said tubular arms into said tubing.

13. A device according to claim 1 wherein said device comprises a plurality of means for extracting said lightweight articles.

14. The device according to claim 7 wherein the device comprises a plurality of counting means.

* * * * *